United States Patent [19]
Asano et al.

[11] Patent Number: 5,293,763
[45] Date of Patent: Mar. 15, 1994

[54] GEAR SELECT LEVER LOCKING ARRANGEMENT

[75] Inventors: Yasushi Asano; Norio Togano, both of Shizuoka; Satoshi Kobayashi, Kanagawa, all of Japan

[73] Assignee: Fuji Kiko, Ltd/Nissan Motor Co., Ltd., Japan

[21] Appl. No.: 848,660

[22] Filed: Mar. 9, 1992

[30] Foreign Application Priority Data

Mar. 7, 1991 [JP] Japan .................. 3-041600
Mar. 7, 1991 [JP] Japan .................. 3-041601

[51] Int. Cl.$^5$ ...................... B60R 25/06; G05G 5/06
[52] U.S. Cl. ...................... 70/248; 192/4 A; 74/878
[58] Field of Search .............. 70/248, 247, 252, 238, 70/245; 192/4 A; 74/878

[56] References Cited

U.S. PATENT DOCUMENTS

| | | | |
|---|---|---|---|
| 4,671,085 | 6/1987 | Yamaguchi et al. | 70/248 |
| 4,905,802 | 3/1990 | Gotoh | 70/247 |
| 4,926,688 | 5/1990 | Murasaki | 70/248 |
| 4,967,883 | 12/1990 | Kito et al. | 70/248 |
| 5,003,799 | 4/1991 | Imai et al. | 70/247 |
| 5,036,962 | 8/1991 | Amagasa | 70/248 |
| 5,127,245 | 7/1992 | Imai et al. | 70/247 |

FOREIGN PATENT DOCUMENTS 60-135352 7/1985 Japan .
1-204828 8/1989 Japan .
1-249527 10/1989 Japan .

*Primary Examiner*—Peter M. Cuomo
*Assistant Examiner*—Darnell M. Boucher
*Attorney, Agent, or Firm*—Ronald P. Kananen

[57] ABSTRACT

A gear select lever locking arrangement comprises a gear select lever with a position pin and a manual push button for moving the position pin into a predetermined notch of a position plate from a groove of the position plate after placing the gear select lever in a P (parking) position. When the position pin moves into the predetermined notch, a catch mechanism shifts from an open position to a catch position. In the catch position, a latch assumes a position to prevent the position pin from moving out of the predetermined notch. The catch mechanism is operatively connected to a blocking mechanism such that when the catch mechanism assumes the open position, the blocking mechanism assumes a blocking position wherein a key operated cylinder is blocked from rotating a predetermined position wherein a key is removable from the key operated cylinder. When the catch mechanism assumes the catch position, the blocking mechanism assumes an unblocking position wherein the key operated cylinder is allowed to rotate to the predetermined position. The catch mechanism includes a blocking mechanism control lever and a keeper.

27 Claims, 7 Drawing Sheets

GEAR SELECT LEVER LOCKING ARRANGEMENT

BACKGROUND OF THE INVENTION

The present invention relates generally to an automotive vehicle having a gear select lever of an automatic transmission, and more particularly to a gear select lever locking arrangement.

Automatic transmissions have a gear select lever having a park position, a neutral position and a drive position. In order to lock the gear select lever in the park position after removing an ignition key from a key operated cylinder, there have been proposed various gear select lever locking arrangements.

Japanese Patent Application First (unexamined) Publication 60-135352 discloses a gear select lever locking arrangement. According to this known arrangement, a bell crank lever is pivotable on a detent plate and has one arm connected by a motion transmitting cable to a blocking mechanism which is designed to block rotation of a key operated cylinder to a predetermined position wherein an ignition key can be removed. The crank lever has another arm which is bifurcated into a latch part and a follower part. The bell crank lever has an open position wherein a position pin of a gear select lever is movable into and out of a park range notch and a catch position wherein the latch part of the bell crank lever prevents the position pin from moving out of the park range notch.

With this known arrangement, since the follower part of the bifurcated arm of the bell crank lever engages the position pin and the bell crank lever rotates to pull or push the motion transmitting cable through a desired amount, options in the size of the bell crank lever and in mounting site of the bell crank lever are reduced.

An object of the present invention is to provide a gear select lever locking arrangement which allows a high degree of design freedom with regard to installation and layout of the component parts.

SUMMARY OF THE INVENTION

According to the present invention, there is provided a gear select lever locking arrangement, comprising:

a key operated cylinder rotatable upon insertion of a key;

a blocking mechanism so constructed and arranged as to block said key operated cylinder from rotating to a predetermined position wherein the key is removable from the key operated cylinder, the blocking mechanism having a blocking position wherein said key operated cylinder is blocked from rotating to the predetermined position and an unblocking position wherein said key operated cylinder is allowed to rotate to the predetermined position;

a gear select lever movable between a plurality of positions including a predetermined position, the gear select lever supporting a position pin and manually operable means for moving the pin;

a postion plate formed with a groove receiving the position pin and a predetermined notch opening to the groove, the predetermined notch being arranged to come into registry with the position pin when the gear select lever is in the predetermined position for receiving the position pin for allowing movement of the position pin from the groove into the predetermined notch;

a catch mechanism constructed and arranged such that movement of the position pin from the groove into the predetermined notch shifts the catch mechanism from an open position to a catch position wherein the position pin is held in the predetermined notch;

the catch mechanism being operatively connected to the blocking mechanism such that when the catch mechanism assumes the open position, the blocking mechanism assumes the blocking position, while when the catch mechanism assumes the catch position, the blocking mechanism assumes the unblocking position;

the catch mechanism including a blocking mechanism control lever and a keeper constructed and arranged such that the keeper cooperates with the blocking mechanism control lever to keep the catch mechanism in the open position thereof when the position pin is disposed out of the predetermined notch, but to allow the catch mechanism to assume the catch position upon movement of the pin into the predetermined notch.

DETAILED DESCRIPTION OF THE INVENTION

Figure 1:
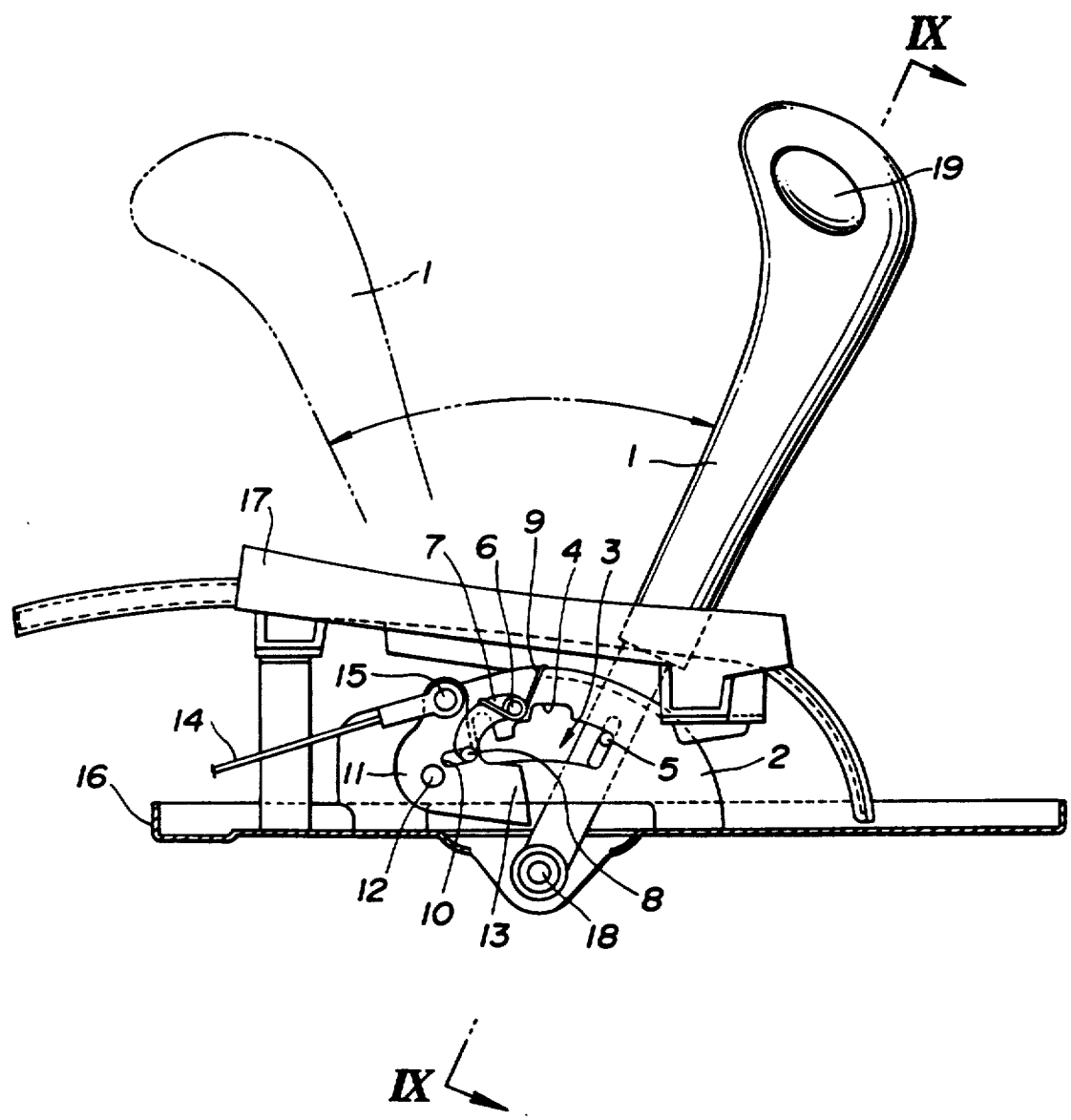
FIG. 1 is a side elevation partially cut away to show a portion of a first embodiment of a gear select lever locking arrangement according to the present invention.
Figure 2:
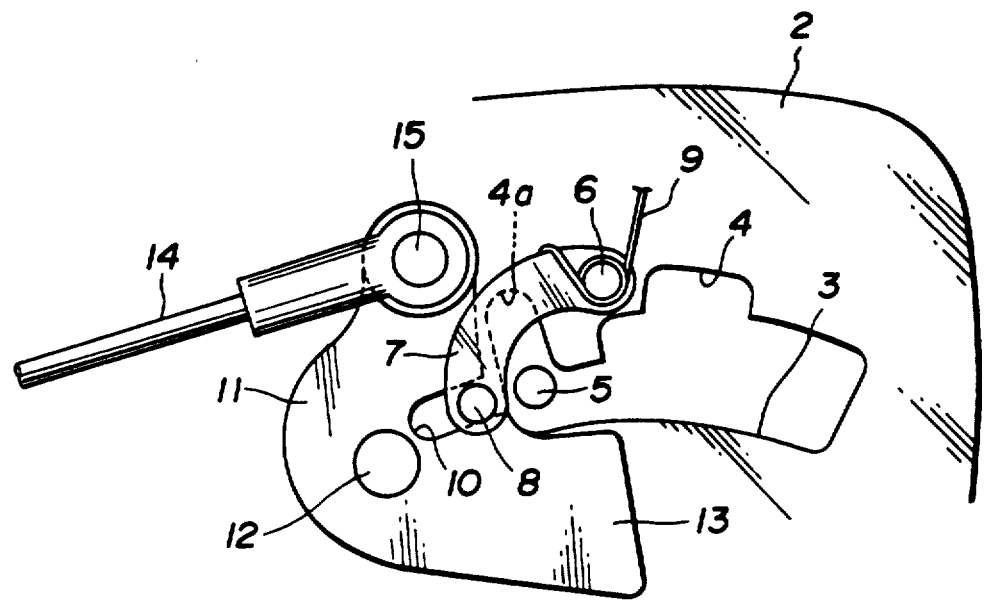
FIG. 2 is a fragmentary enlarged view showing a catch mechanism in an open position.

Referring now to the drawings, particularly to FIGS. 1 and 2, a gear select lever 1 is mounted to a base bracket 16 for swingable movement about an axis 18. The gear select lever 1 extends through an indicator 17. Secured to the base bracket 16 is a position (or detent) plate 2 formed with a groove 3 and a plurality of notches 4 and 4a opening to the groove 3. Designated by the reference numeral 4a is a P (park) range notch. The gear select lever 1 supports a position (or detent) pin 5 and a manual press button 19.

Figure 9:
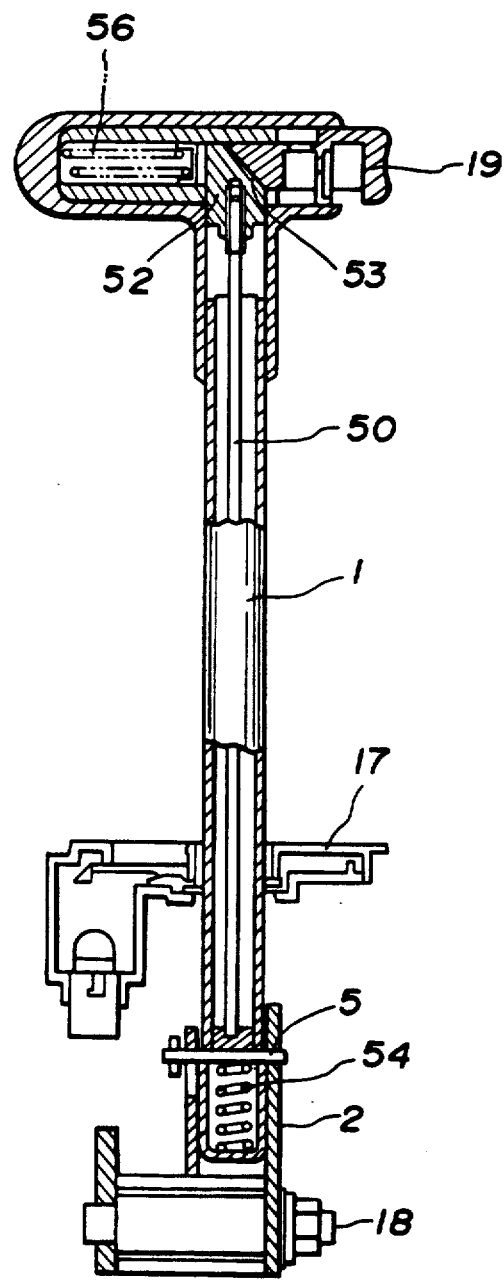
FIG. 9 is a section taken through the line IX—IX of FIG. 1, showing a position pin control mechamism including a manual press button.

As best seen in FIG. 9, a rod 50 is slidably disposed in a shaft portion of the gear select lever 1. Viewing FIG. 9, a rod 50 has a lower end portion fixedly carrying the position pin 5 and an upper end fixedly carrying a cam block 52 which is received in a cam groove 53 formed in the manual push button 19. A spring 54 is disposed to bias the position pin 5 and the rod 50 upwards. A return spring 56 biases the manual push button 19 to its projected position. When the manual push button 19 is depressed, the spring 54 yields to allow downward movement of the position pin 5.

Figure 3:
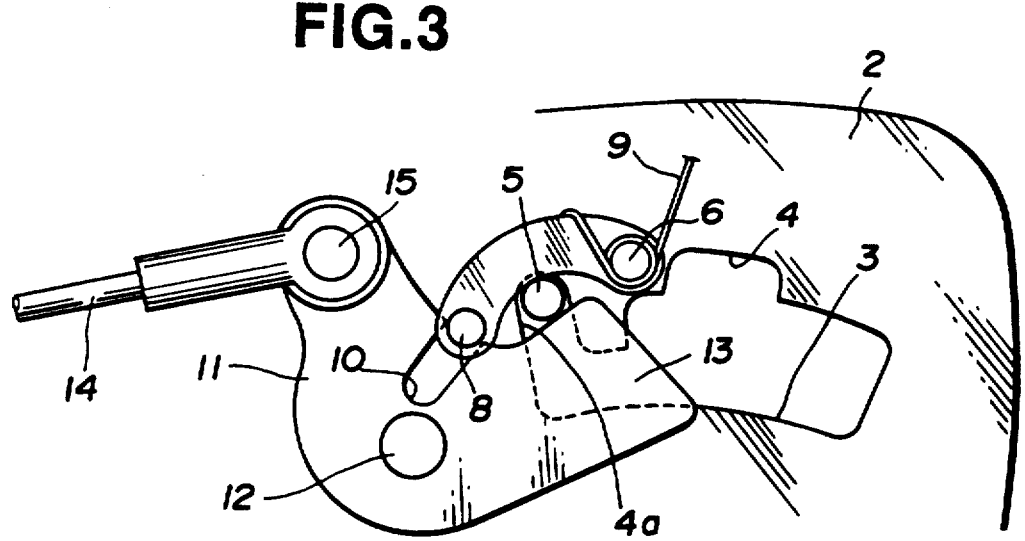
FIG. 3 is a similar view to FIG. 2, showing the catch mechanism in a catch position.

Referring back to FIG. 1, the position pin 5 is positioned within the groove 3 when moving the gear select lever 1 while the manual push button 19 is kept depressed. A catch mechanism is mounted to the position plate 2. The catch mechanism includes a blocking mechanism control lever 11 swingably mounted to the position plate 2 on a first axis 12 and a keeper. The keeper includes a keeper lever 7 swingably mounted to the position plate 2 about a second axis 6 and a spring 9 for resiliently biasing the keeper lever 7 counterclockwise, as viewed in FIG. 1, to urge the catch mechanism to assume an open position, as shown in FIG. 2. The keeper lever 7 has a pin 8 on one end thereof. The pin 8 slidably engages a cut-out 10 with which the blocking mechanism control lever 11 is formed. The pin 8 and the cut-out 10 cooperate with each other to convert swinging movement of the keeper lever 7 about the second axis 6 into swinging movement of the blocking mechanism control lever 11 about the first axis 12. The blocking mechanism control lever 11 includes a latch 13. When the catch mechanism is in a catch position as shown in FIG. 3, the latch 13 of the blocking mechanism control lever 11 assumes the position shown in FIG. 3 to prevent the position pin 5 from moving out of the P range notch 4a.

With the catch mechanism in the open position as shown in FIG. 2, when the position pin 5 moves into the P range notch 4a as a result of releasing the manual push button 19 after placing the gear select lever 1 to the P (park) position, the keeper lever 7 is displaced on the second axis 6. This results in moving the pin 8 clockwise about the second axis 6, causing the blocking mechanism control lever 11 to swing counterclockwise about the first axis 12 until the catch mechanism assumes the catch position as shown in FIG. 3. In the catch position, the position pin 5 is disposed in the P range notch 4a snugly between the keeper lever 7 and the latch 13 of the blocking mechanism control lever 11.

The blocking mechanism control lever 11 is connected to a blocking mechanism by a motion transmitting member, such as a motion transmitting cable 14, or a rod. The motion transmitting cable 14 has one end anchored to a pin 15 mounted to the blocking mechanism control lever 11 and an opposite end anchored to a blocking plate 60 slidably received in a groove 62 formed in a steering column 64, as shown in FIGS. 10 and 11.

Figure 10:
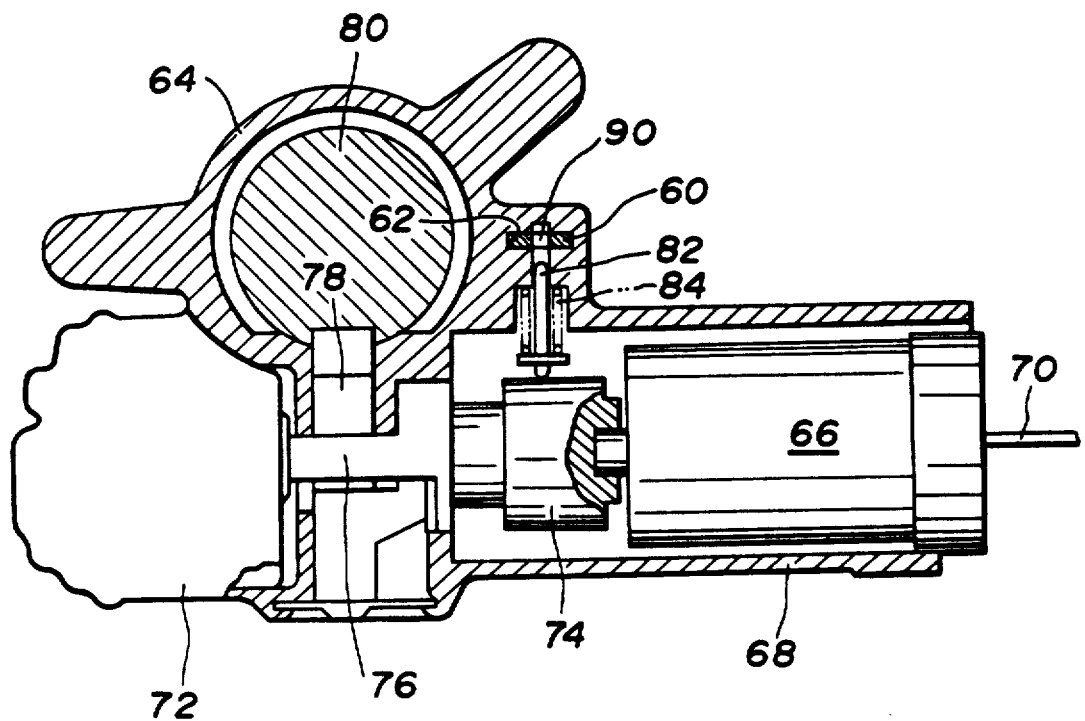
FIG. 10 is an igntion key assembly including a key operated cylinder and a block mechanism for blocking rotation of the key operated cylinder to a predetermined position.
Figure 11:
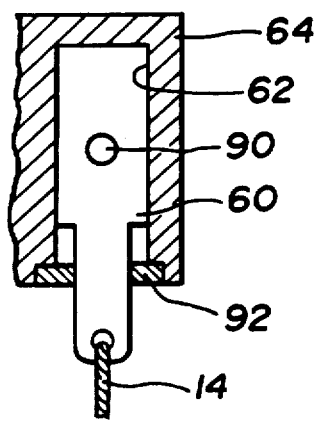
FIG. 11 is a blocking plate of the blocking mechanism.

Referring to FIGS. 10 and 11, the blocking mechanism is explained. A key operated cylinder 66 is disposed in a key cylinder housing 68. The key operated cylinder 66 is rotatable upon insertion of an ignition key 70. Rotation of the key operated cylinder 66 is transmitted to an engine start switch 72 by means of a first cam 74 and a second cam 76. The first and second cams 74 and 76 are fixedly coupled with the key operated cylinder 66 for unitary rotation therewith. The second cam 76 is provided to control a lock bolt 78 for locking a steering shaft 80. The first cam 74 cooperates with a lock pin 82, which lock pin 82 is biased by a spring 84 to maintain engagement with the first cam 74. The first cam 74 has a cam lobe which engages the lock pin 82 to lift against bias of the spring 84. This lift movement of the lock pin is allowed when the blocking plate 60 is in an unblocking position wherein an opening 90 of the blocking plate 60 is in registry with the lock pin 82, allowing the lift of the lock pin 82, thus allowing rotation of the key operated cylinder 66 to a predetermined position, i.e., a LOCK (lock) position. In the lock position, the ignition key 70 can be removed from the key operated cylinder 66. FIG. 11 shows the blocking plate 60 when the blocking mechanism is in the unblocking position. Pulling the motion transmitting cable 14 downward, as viewed in FIG. 11, causes the blocking plate 60 to move downward until limited by a stop 92, causing the blocking mechanism to assume a blocking position wherein, since lift of the lock pin 82 is prevented by the blocking plate 60, the key operated cylinder 66 is blocked from rotating to the lock position.

Referring to FIGS. 2, 3, 10 and 11, the catch mechanism is operatively connected to the blocking mechanism such that when the catch mechanism assumes the open position as shown in FIG. 2, the blocking mechanism assumes the blocking position, while when the catch mechanism assumes the catch position as shown in FIG. 3, the blocking mechanism assumes the unblocking position as shown in FIGS. 10 and 11.

After a shift from the open position as shown in FIG. 2 to the catch position as shown in FIG. 3, the blocking plate 60 assumes the position as shown in FIG. 11 owing to the motion transmitting cable 14 pushing the blocking plate 60 inward to the groove 62. Thus, the key operated cylinder 66 can be turned by the ignition key 70 to the lock position wherein the ignition key 70 can be removed. Since the lock pin 82 is inserted into the opening 90, the blocking mechanism control lever 11 is held in the illustrated position as shown in FIG. 3. Thus, even if the manual press button 19 is pressed to move the position pin 5 out of the P range notch 4a, such movement of the position pin 5 is prevented by the latch 13 of the blocking mechanism control lever 11.

From the above description, it is now appreciated that after having removed the ignition key 70 from the key operated cylinder 66, the gear select lever 1 is locked in the P (park) position. Thus, only when the ignition key 70 is inserted again and turned from the lock position beyond a predetermined position wherein the first cam 72 allows the lock pin 82 to retract from the opening 90 of the blocking plate 60, the position pin 5 can move out of the P range notch 4a into the groove 3 upon pressing the manual press button 19. Thereafter, operation of the gear select lever 1 is allowed. Further, even if the engine is started by some means other than the ignition key 70, driving of the vehicle is not possible since the gear select lever 1 is locked in the P (park) position.

Thus, the gear select lever 1 must be placed to the P (park) position in order to remove the ignition key 70 from the key operated cylinder 66. In order to start the engine for driving, the ignition key 70 must be inserted into the key operated cylinder 66 and turned to start the engine, then the manual press button 19 is pressed for moving the position pin 5 out of the P range notch 4a against the latch 13 of the blocking mechanism control lever 11, causing the blocking mechanism control lever 11 to swing clockwise, moving the pin 15 anchoring the motion transmitting cable 14 to the right viewing FIGS. 2 and 3, causing the blocking plate 60 to move downward, as seen in FIG. 11, to the blocking position, in turn rotating the keeper lever 7 counterclockwise against the bias of the spring 9. In this manner, the position pin 5 moves out of the P range notch 4a to the groove 3. Thereafter, the gear select lever 1 can be placed in any desired range position.

Figure 4:
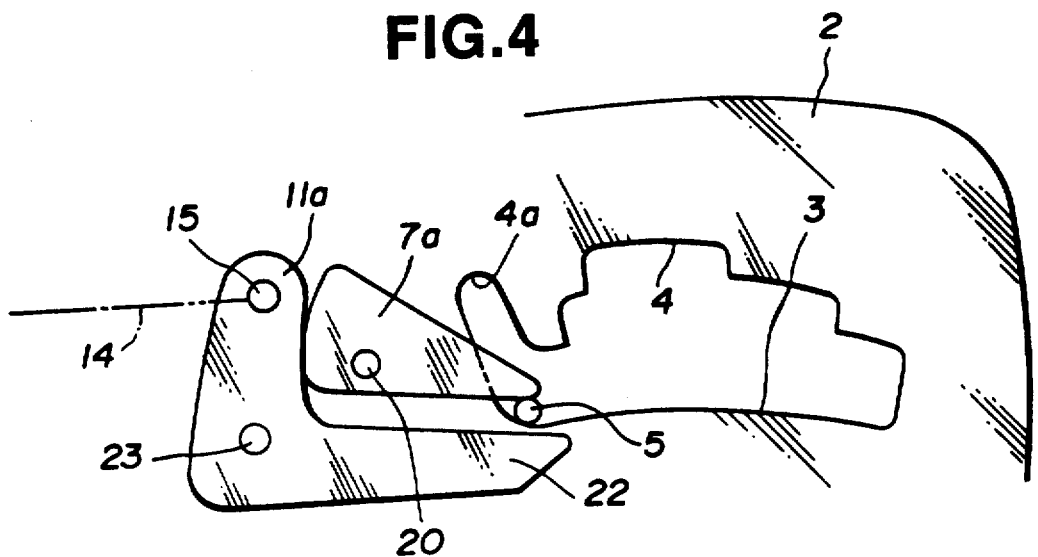
FIG. 4 is a catch mechanism of a second embodiment of a gear select lever locking arrangement according to the present invention, the catch mechanism assuming an open position.
Figure 5:
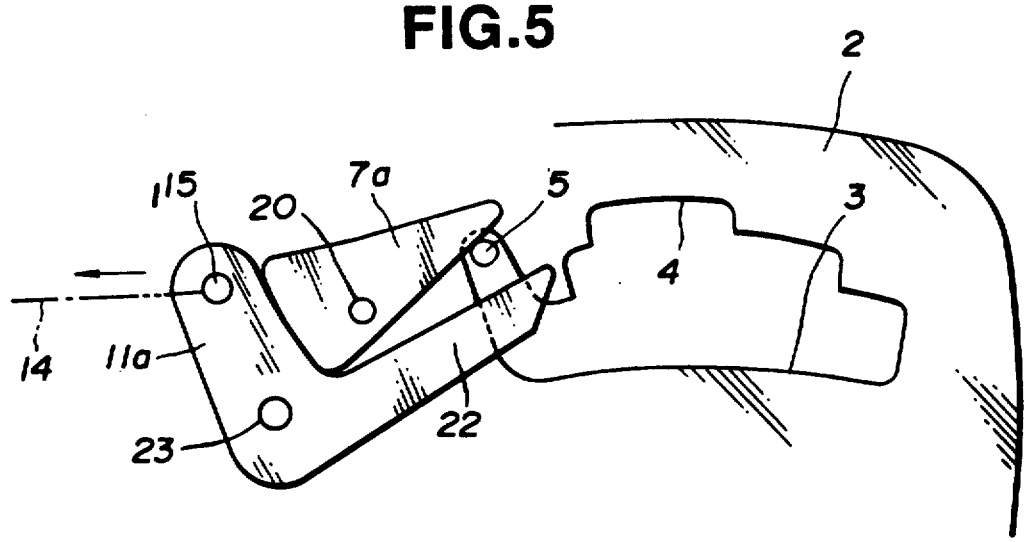
FIG. 5 is similar view to FIG. 4 showing the catch mechanism in a catch position.

Referring to FIGS. 4 and 5, a second embodiment is explained. This second embodiment is substantially the same as the first embodiment except the manner of converting swinging movement of a keeper lever into swinging movement of a blocking mechanism control lever.

Referring to FIG. 4, it is seen that a blocking mechanism control lever 11a is mounted to a position plate 2 for swingable movement about a first axis 23 and a keeper lever 7a is mounted to the position plate 2 for swingable movement about a second axis 20. Although not shown, a spring is provided to bias the keeper lever 7a clockwise, viewing FIGS. 4 and 5, to urge the catch mechanism to assume an open position as shown in FIG. 4. The blocking mechanism control lever 11a includes a latch 22. The keeper lever 7a is triangular and is designed to engage the blocking mechanism control lever 11a to cause the blocking mechanism control lever 11a to follow movement of the keeper lever 7a. When the gear select lever 1 is placed in the P (park) position and the position pin 5 is moved into the P range notch 4a owing to release of the manual press button 19, the keeper lever 7a is rotated counterclockwise against the bias of the spring (not shown). The movement of the keeper lever 7a is followed by the blocking mechanism control lever 11a until the catch mechanism assumes a catch position as shown in FIG., 5.

Figure 6:
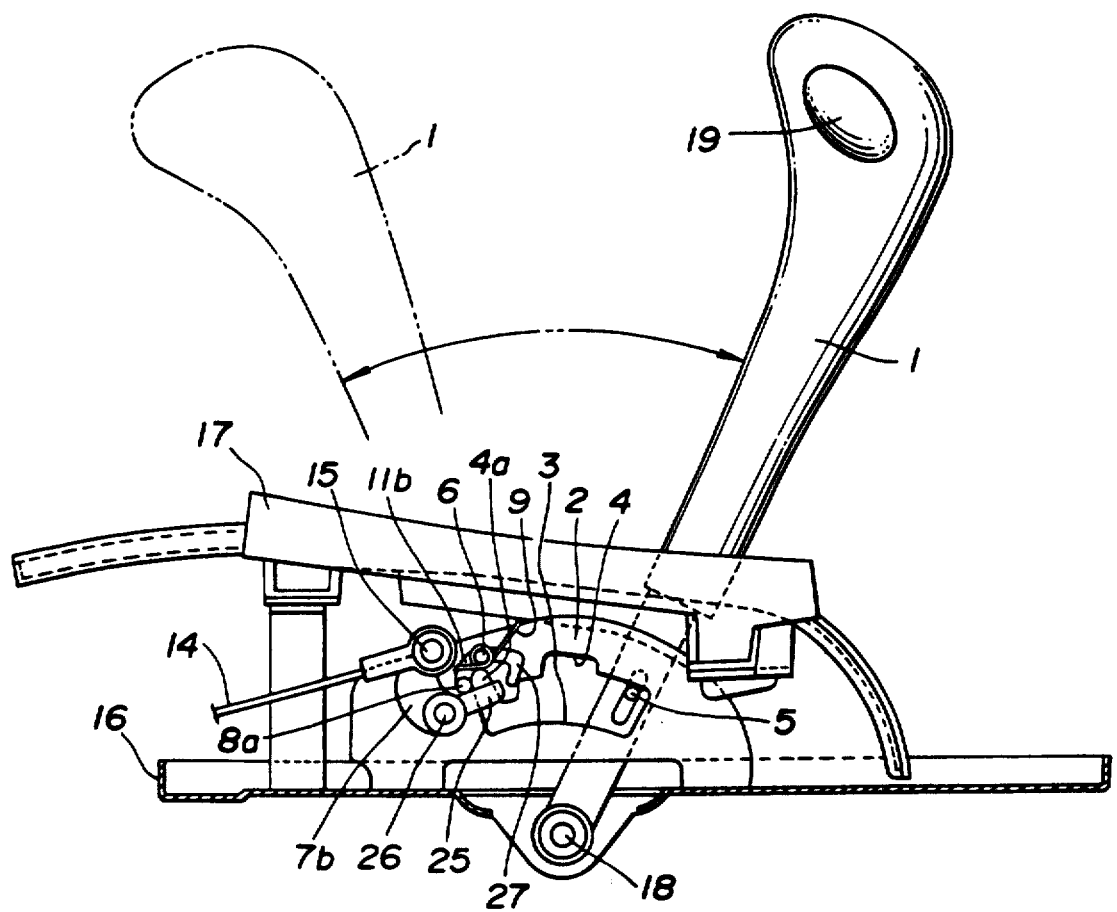
FIG. 6 is a similar view to FIG. 1, showing a third embodiment of a gear select lever locking arrangement according to the present invention.
Figure 7:
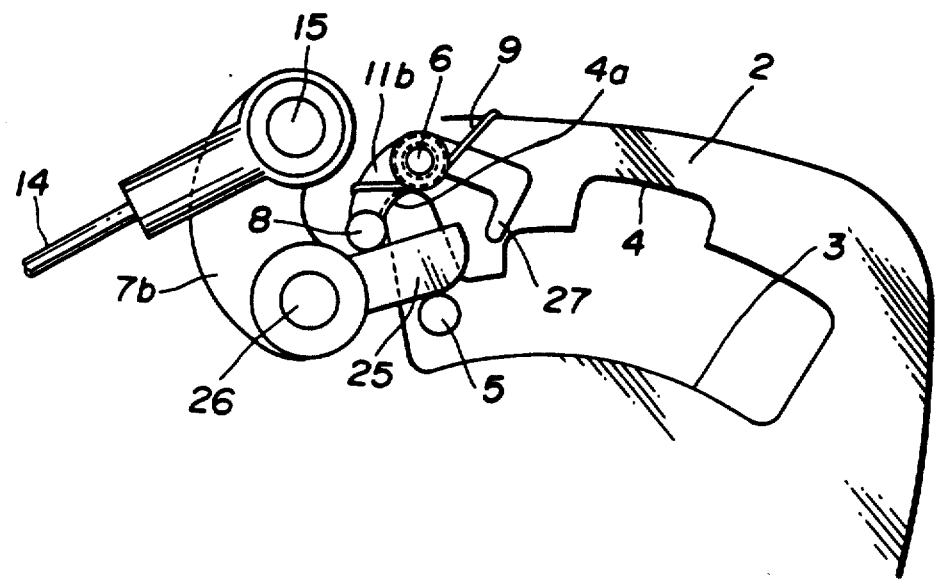
FIG. 7 is a fragmentary enlarged view of FIG. 6 showing a catch mechanism in an open position.
Figure 8:
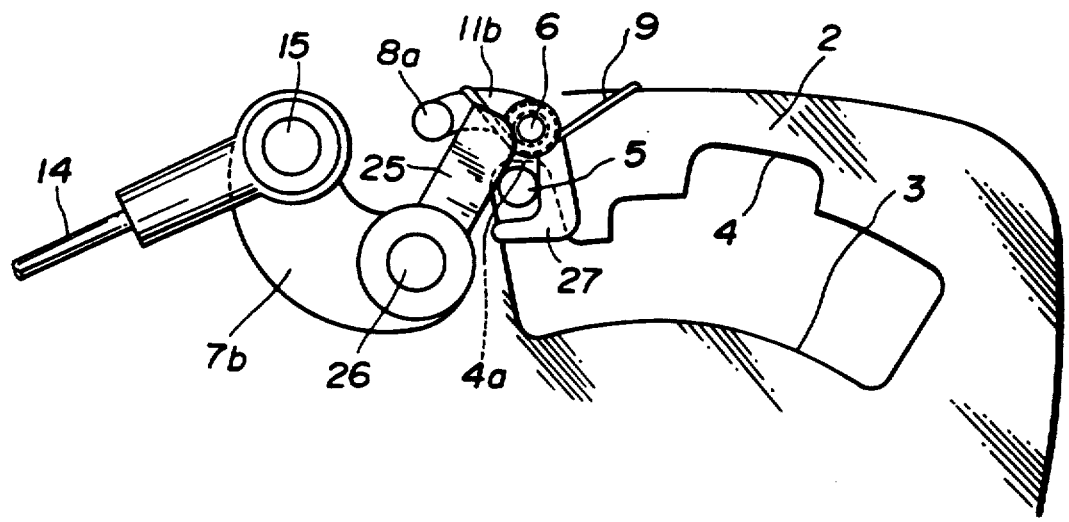
FIG. 8 is a similar view to FIG. 7, showing the catch mechanism in a catch position.

Referring to FIGS. 6-8, a third embodiment is explained. This third embodiment is substantially the same as the first embodiment except that a keeper lever thereof includes a latch.

Referring to FIG. 7, a blocking mechanism control lever 7b is mounted to a position plate 2 for swingable movement about a first axis 26, and a keeper lever 11b is mounted to the position plate 2 for swingable movement about a second axis 6. A spring 9 is mounted to bias the keeper lever 11b counterclockwise as viewed in FIGS. 7 and 8. The keeper lever 11b has one arm formed with a latch 27 and another arm with a pin 8a resting on an arm 25 of the blocking mechanism control lever 7b.

When a gear select lever 1 is moved to the P (park) position and a manual press button 19 is released, a position pin 5 is urged to move into a P range notch 4a. During this movement, the position pin 5 first contacts the arm 25 of the blocking mechanism control lever 7b, pushing the arm 25 upwards as viewed in FIG. 7. This movement of the arm 25 pushes the pin 8a and thus it is converted into a clockwise rotation of the keeper lever 11b about the second axis 6 until the catch mechanism assumes a catch position as shown in FIG. 8 wherein the latch 27 assumes a position to prevent the position pin 5 from moving out of the P range notch 4a.

What is claimed is:

1. A gear select lever locking arrangement, comprising:
 a key operated cylinder rotatable upon insertion of a key;
 a blocking mechanism so constructed and arranged as to block said key operated cylinder from rotating to a predetermined position wherein the key is removable from said key operated cylinder, said blocking mechanism having a blocking position wherein said key operated cylinder is blocked from rotating to said predetermined position and an unblocking position wherein said key operated cylinder is allowed to rotate to said predetermined position;
 a gear select lever movable between a plurality of positions including a predetermined position, said gear select lever supporting a position pin and manually operable means for moving said pin;
 a position plate formed with a groove receiving said position pin and a predetermined notch opening to said groove, said predetermined notch being arranged to come into registry with said position pin when said gear select lever is in said predetermined position for receiving said position pin for allowing movement of said position pin from said groove into said predetermined notch;
 a catch mechanism constructed and arranged such that movement of said position pin from said groove into said predetermined notch shifts said catch mechanism from an open position to a catch position, said catch mechanism including a blocking mechanism control lever rotatable about a first axis, a keeper lever rotatable around a second axis, said keeper lever being moved according to movement of said position pin when said position pin contacts said keeper lever when moving into said predetermined notch, movement of said keeper lever causing rotation of said blocking mechanism control lever around said first axis such that a projecting portion of said blocking mechanism control lever is moved to contact a side of said position pin other than that contacting said keeper lever such that said position pin is held locked between said keeper lever and said projecting portion of said blocking mechanism control lever within said predetermined notch, thus establishing said catch position;
 said blocking mechanism control lever of said catch mechanism being operatively connected to said blocking mechanism such that when said catch mechanism assumes said open position, said blocking mechanism assumes said blocking position, while when said catch mechanism assumes said catch position, said blocking mechanism assumes said unblocking position.

2. A gear select lever locking arrangement as claimed in claim 1, wherein said first and second axes of said blocking mechanism control lever and said keeper lever, respectively, are rotatably mounted to said position plate.

3. A gear select lever locking arrangement as claimed in claim 2, wherein said blocking mechanism control lever is connected to said blocking mechanism by a motion transmitting member.

4. A gear select lever locking arrangment as claimed in claim 3, wherein said motion transmitting member is a motion transmitting cable.

5. A gear select lever locking arrangement as claimed in claim 1, further including spring means for resiliently biasing said keeper lever in such a direction as to urge said catch mechanism to assume said open position thereof.

6. A gear select lever arrangement as claimed in claim 1, wherein said keeper lever is urged for swingable movement about said second axis by said position pin in moving into and out of said predetermined notch, and said catch mechanism includes pin and cut-out means for converting said swingable movement of said keeper lever about said second axis into swingable movement of said blocking mechanism control lever about said first axis.

7. A gear select lever locking arrangement as claimed in claim 6, wherein said pin and cut-out means include a pin on said keeper lever and a cut-out formed into said blocking mechanism control lever.

8. A gear select lever locking arrangement as claimed in claim 1, wherein said keeper lever is urged for swingable movement about said second axis by said position pin in moving into and out of said predetermined notch, and said catch mechanism includes means for converting said swingable movement of said keeper lever about said second axis into swingable movement of said blocking mechanism control lever about said first axis.

9. A gear select lever locking arrangement as claimed in claim 5, wherein said keeper lever includes a latch.

10. A gear select lever locking arrangement as claimed in claim 9, wherein said blocking mechanism control lever is urged for swingable movement about said first axis by said position pin in moving into and out of said predetermined notch, and said catch mechanism includes pin and arm means for converting said swingable movement of said blocking mechanism control lever into swingable movement of said keeper lever about said second axis.

11. A gear select lever locking arrangement as claimed in claim 10, wherein said pin and arm means include a pin on said keeper lever and an arm integral with said blocking mechanism control lever.

12. A gear select lever locking arrangement as claimed in claim 10 wherein when said catch mechanism is in said catch position thereof, said latch of said keeper lever assumes a position to prevent said position pin from moving out of said predetermined notch.

13. An automotive gear select lever locking arrangement comprising:
- a select lever including a detent pin provided on a movable portion thereof:
- a rotatably mounted first lever, said first lever positionable in at least a set position and an engaged position in which it contacts said detent pin, said first lever being rotated by said detent pin from said set position to said engaged position at a predetermined position of said detent pin;
- a rotatably mounted second lever, being rotatingly movable according to rotation of said first lever, said second lever positionable in at least a set position and an engaged position corresponding to said set and engaged positions of said first lever, and including a portion connected to a connection means engaged with a key interlock mechanism, and a projecting portion for establishing locking of said detent pin, said key interlock mechanism being in a first state in said set position of said second lever and in a second state in said engaged position of said second lever wherein said projection portion contacts said detent pin for locking said select lever.

14. A gear shift lever locking arrangement as set forth in claim 13, wherein in said first state said key interlock mechanism is engaged to block a cylinder of said key interlock mechanism from rotating to a lock position wherein a key is removable from said cylinder, and wherein in said second state said key interlock mechanism is disengaged to allow said cylinder to rotate to said lock position.

15. A gear select lever locking arrangement as set forth in claim 13, wherein said predetermined position corresponds to a park position of an automotive transmission.

16. A gear select lever locking arrangement as set forth in claim 13, wherein said second lever is a bell crank, one arm of said bell crank being connected to a cable connected to said key interlock mechanism and the other arm of said bell crank comprising said projecting portion.

17. A gear shift lever locking arrangement as set forth in claim 16, wherein said bell crank is connected to said key interlock mechanism by a rod.

18. A gear select lever locking arrangement as set forth in claim 13, wherein said first lever further includes a pin and said second lever includes a cut-out portion, said pin of said first lever engaging said cut-out portion of said second lever upon rotation of said first lever to said engaged position, said engagement of the first lever with the cut-out portion changing the position of said second lever to the engaged position thereof.

19. A gear select lever locking arrangement as set forth in claim 13, wherein said first lever is substantially triangular such that one angle thereof intersects a path of movement of said detent pin and a surface thereof contacts a surface of said second lever for maintaining a set position of said second lever, such that, when said detent pin assumes said predetermined position, said first lever rotates to said engaged position such that said one angle of said first lever is moved and said contacting surfaces of said first and second levers are separated allowing rotation of said second lever to said engaged position thereof.

20. A gear shift lever locking arrangement as set forth in claim 13, wherein said first lever is biased in a first direction towards said set position by a spring.

21. A gear shift lever locking arrangement as set forth in claim 15, wherein said first and second levers are mounted on a detent plate, said detent plate including a guide opening for allowing a movement of said detent pin and a detent groove for guiding said detent pin for assuming various gear positions of said transmission and including a detent groove representative of a park position of said transmission.

22. A gear select lever locking arrangement as set forth in claim 13, wherein said select lever further includes a push button, actuation of said push button changing a position of said detent pin relative to said moving portion of said select lever.

23. A gear select lever locking arrangement for an automotive transmission, couprising:
- a select lever including a detent pin provided on a movable portion thereof;
- a detent plate for guiding said detent pin for establishing various gear positions including a detent groove for establishing a park position of said transmission when said detent pin is seated in said detent groove;
- a rotatably mounted first lever, said first lever positionable in at least a set position and an engaged position and being rotated by said detent pin from said set position to said engaged position according to contact of said detent pin with said first lever when said detent pin is seated in said detent groove for establishing said park position of said transmission;
- a rotatably mounted bell crank lever being rotatingly movable according to rotation of said first lever, said bell crank lever positionable in at least a set position and an engaged position corresponding to said set and engaged positions of said first lever, and including two arm portions, a first arm portion being connected to a cable engaged with a key interlock mechanism and a second arm portion comprising a projecting portion, said key interlock mechanism being active to block a cylinder of said key interlock mechanism from rotating to a lock position wherein a key is removable from said cylinder in a set position of said bell crank lever, and wherein said key interlock mechanism being active to allow said cylinder to rotate to said lock position at said engaged position of bell crank lever, wherein said projecting portion of said bell crank lever is positioned when in said engaged position so as to contact said detent pin for locking said first lever.

24. A gear select lever locking arrangement as set forth in claim 23, wherein said first lever further includes a pin and said bell crank lever includes a cut-out portion, said pin of said first lever engaging said cut-out portion of said bell crank lever upon rotation of said first lever to said engaged position, and said engagement of said pin with said cut-out portion changing the position of said bell crank lever to the engaged position thereof.

25. A gear shift lever locking arrangement as set forth in claim 23, wherein said first lever and said bell crank lever are mounted on said detent plate.

26. A gear select lever locking arrangement as set forth in claim 23, wherein said select lever further includes a push button, actuation of said push button changing a position of said detent pin relative to said moving portion of said select lever.

27. A gear select lever locking arrangement, comprising:
  a key operated cylinder rotatable upon insertion of a key;
  a blocking mechanism so constructed and arranged as to block said key operated cylinder from rotating to a predetermined position wherein the key is removable from said key operated cylinder, said blocking mechanism having a blocking position wherein said key operated cylinder is blocked from rotating to said predetermined position and an unblocking position wherein said key operated cylinder is allowed to rotate to said predetermined position;
  a gear select lever movable between a plurality of positions including a predetermined position, said gear select lever supporting a position pin and manually operable means for moving said pin;
  a position plate formed with a groove receiving said position pin and a predetermined notch opening to said groove, said predetermined notch being arranged to come into registry with said position pin when said gear select lever is in said predetermined position for receiving said position pin for allowing movement of said position pin from said groove into said predetermined notch;
  a catch mechanism constructed and arranged such that movement of said position pin from said groove into said predetermined notch shifts said catch mechanism from an open position to a catch position, said catch mechanism including a first lever rotatable around a first axis and a second lever rotatable around a second axis, said first lever including a projecting portion which is moved according to movement of said position pin when said position pin contacts said projection portion when moving into said predetermined notch, movement of said first lever causing rotation of said second lever around said second axis such that a latch portion of said second lever is moved to latch said projecting portion of said first lever for retaining said projecting portion in a locked position such that said position pin is held locked between said projecting portion of said first lever and the latch portion of said second lever within said predetermined notch, thus establishing said catch position;
  said first lever of said catch mechanism being operatively connected to said blocking mechanism such that when said catch mechanism assumes said open position, said blocking mechanism assumes said blocking position, while when said catch mechanism assumes said catch position, said blocking mechanism assumes said unblocking position.

* * * * *